United States Patent [19]

König et al.

[11] Patent Number: 5,612,408

[45] Date of Patent: Mar. 18, 1997

[54] POLYURETHANE-BASED THICKENERS FOR AQUEOUS COMPOSITIONS

[75] Inventors: Klaus König, Odenthal; Jürgen Schwindt, Leverkusen; Jan Mazanek; Josef Pedain, both of Köln; Manfred Dietrich, Leverkusen; Gerhard Klein, Monheim; Karl-Roland Jerg, Köln, all of Germany

[73] Assignee: Bayer Aktiengesellschaft, Leverkusen, Germany

[21] Appl. No.: 593,036

[22] Filed: Jan. 29, 1996

[30] Foreign Application Priority Data

Feb. 2, 1995 [DE] Germany .................. 195 03 281.0

[51] Int. Cl.$^6$ .......................... C08G 18/12; C08G 18/42
[52] U.S. Cl. ...................... 524/591; 525/409; 528/76; 528/77; 528/79
[58] Field of Search ................ 528/76, 77, 79; 525/409; 524/591

[56] References Cited

U.S. PATENT DOCUMENTS

| | | | |
|---|---|---|---|
| 3,632,780 | 1/1968 | Kuth et al. | 8/42 |
| 4,079,028 | 3/1978 | Emmons et al. | 260/29.6 NR |
| 4,499,233 | 2/1985 | Tetenbaum et al. | 524/591 |
| 5,023,309 | 6/1991 | Kruse et al. | 528/49 |
| 5,378,756 | 1/1995 | Thies et al. | 524/591 |
| 5,500,475 | 3/1996 | Eicken et al. | 524/591 |

FOREIGN PATENT DOCUMENTS

| | | |
|---|---|---|
| 1177988 | 11/1984 | Canada . |
| 260430 | 3/1988 | European Pat. Off. . |
| 307775 | 3/1989 | European Pat. Off. . |
| 498442 | 8/1992 | European Pat. Off. . |

*Primary Examiner*—Patricia A. Short
*Attorney, Agent, or Firm*—Joseph C. Gil; Thomas W. Roy

[57] ABSTRACT

The present invention relates to a process for the preparation of polyurethanes suitable for use as thickeners for aqueous compositions by reacting at an NCO/OH equivalent ratio of 0.9:1 to 1.2:1 a) a polyether component having an OH number of 10 to 30 mg KOH/g and obtained by the alkoxylation of a mixture of a1) 30 to 80 mole % of a monofunctional alcohol or alkylphenol having 8 to 30 carbon atoms, a2) 2 to 10 mole % of sodium hydroxide or potassium hydroxide, a3) 10 to 60 mole % of water and a4) 0 to 10 mole % of a trihydric to hexahydric alcohol having a molecular weight of 92 to 600, with ethylene oxide or a mixture of ethylene oxide with up to 20 mole %, based on the total moles of alkylene oxides, of propylene oxide, in which the percentages of a1) to a4) add up to 100, with b) a polyisocyanate component containing at least one organic diisocyanate, optionally in admixture with up to 20 mole %, based on the total moles of component b), of higher than difunctional polyisocyanates.

The invention also relates to the polyurethanes obtainable by this method and their use, optionally in combination with other thickeners, for the thickening of aqueous systems.

9 Claims, No Drawings

POLYURETHANE-BASED THICKENERS FOR AQUEOUS COMPOSITIONS

BACKGROUND OF THE INVENTION

1. Field of the Invention

The invention relates to a simplified method for the preparation of highly effective polyurethanes suitable as thickeners for aqueous systems, the resulting polyurethanes and their use for thickening aqueous compositions.

2. Description of the Prior Art

Polyurethane-based thickeners for aqueous systems are described in numerous publications (cf., for example, DE-OS 1,444,243, DE-OS 3,630,319, EP-A 0,031,777, EP-A 0,307,775, EP-A 0,495,373, U.S. Pat. No. 4,079,028, U.S. Pat. No. 4,155,892, U.S. Pat. No. 4,499,233 or U.S. Pat. No. 5,023,309).

The prior art thickeners have in common the simultaneous presence of (i) hydrophilic segments in a quantity of at least 50 wt. %; (ii) hydrophobic segments in a quantity of at most 10 wt. % and (iii) urethane groups. The "hydrophilic segments" in these thickeners are primarily polyether chains having at least 5 alkylene oxide units as chain segments in which at least 60 mole % of these units are ethylene oxide units. "Hydrophobic segments" are primarily hydrocarbon segments having at least 6 carbon atoms.

As shown by the literature cited and the work reproducing it, thickeners having a satisfactory or good thickening action may only be obtained when the following conditions are adhered to.

1) The hydrophilic, optionally previously lengthened, polyether segments must have a long chain length of at least 6,000, preferably 10,000 molecular weight units.
2) They must be built up almost entirely from ethylene oxide.
3) The hydrophobic segments must possess at least 12 carbon atoms and be joined at least at two chain ends.
4) Hydrophilic and hydrophobic constituents must be present in a weight ratio of 92 to 97% and 3 to 8%, respectively.

The thickeners should also have as low an inherent viscosity as possible (for example, 10–50 Pa.s/23° C.), so that they can be processed (measured out) without difficulty, optionally in the form of solutions of the highest possible concentration. This requirement rules out, for example, the preparation of long hydrophilic segments by the chain-lengthening reaction of comparatively low-molecular weight polyether diols with diisocyanates, because as the concentration of urethane groups increases, an undesirable increase in viscosity also occurs.

The synthesis of hydrophilic/hydrophobic polyurethanes which are suitable for the preparation of thickeners and which satisfy the above-mentioned requirements can be carried out by various methods known in the literature. In one method polyethylene oxide-based polyethers having a molecular weight of 10,000 to 20,000 and having at least two hydroxyl end groups are reacted with the equivalent quantity of an aliphatic monoisocyanate ($C_{12}$-$C_{24}$).

Although this synthesis appears to be relatively simple, it nevertheless has several disadvantages. It requires polyethers having molecular weights which in the conventional industrial production of polyethers can only be reproducibly obtained at great expense. To produce these polyethers generally an alcoholate mixture is initially prepared from ethylene glycol or from an oligomer (di-, tri- or tetraethylene glycol) by the addition of a concentrated sodium hydroxide or potassium hydroxide solution followed by careful dehydration. Then at 90°–150° C. ethylene oxide is added and polymerized under moderate excess pressure.

In order to ensure that during the preparation of these polyethers the polymerization in the final stage still proceeds at an economically justifiable rate, a "covering" of the OH groups with more than 20% alkali, preferably of more than 50% alkali is necessary. This amounts to the use of more than 20 mole %, preferably more than 50 mole %, of alkali hydroxide per mole of hydroxyl groups. Such a high covering leads to the onset of a reaction, in which only low molecular weight diols used as starters are present, to form heterogeneous mixtures which are difficult to stir and which only contain 1 to 2 wt. % of the desired high molecular weight (MW) polyether alcohols aimed for.

Due to these enormous differences in volume during the course of the reaction and to the problems connected therewith regarding the dissipation of the heat of reaction, in practice the preparation of the high molecular weight polyether alcohols is carried out in several stages. Thus, e.g., in a first step with low covering of alkali (for example, 5–10%) a polyethylene oxide having an average MW of 400 to 800 is produced. In a second step with a higher covering of alkali (10–20%) a polyether having a MW of 2,000–4,000 is produced. Finally, in a third step with a covering of 20–60% alkali the desired high molecular weight polyether is produced. The same procedure is necessary when higher functional starters (glycerol, pentaerythritol, sorbitol) are used. This procedure necessarily results in a relatively high expenditure with regard to reaction time, repeated dehydration and analytical technical support and consequently high costs.

The long reaction times and repeated interruptions favor secondary reactions (for example, due to access of air), which can lead to nonfunctional end groups (for example, vinyl groups or carbonyl groups).

The monoisocyanates used for the introduction of the hydrophobic groups are expensive specialized products having a limited market.

The polyether must be absolutely free of water because otherwise the monoisocyanates form long-chain ureas, which lead to turbidity and precipitation in the aqueous systems to be thickened.

In a second method monofunctional polyether alcohols having a molecular weight of 5000 to 10,000 are prepared by the ethoxylation of fatty alcohols or alkylphenols having 12 to 24 carbon atoms and then are reacted with diisocyanates.

The previously mentioned problems associated with the preparation of the polyethers also exist here. The alcoholate mixture used as the starter corresponds to about 3 to 6 wt. % of the quantity of polyether alcohol obtained and the covering of catalyst necessary for the final stage of the reaction cannot be supplied at the beginning. In the preparation of alcoholate from the alcohol/sodium hydroxide solution mixture by dehydration, the outcome is troublesome steam distillation of the starter and crystallization out (in the case of solid compounds) in the column and in the cooling apparatus of the distillation device.

In a third method an NCO prepolymer is initially synthesized from diisocyanates and the polyether alcohols prepared by the method described under 1) and is subsequently reacted with fatty alcohols or alkylphenols having 12 to 24 carbon atoms.

In this method the use of expensive monoisocyanates is avoided. But the problems relating to the preparation of polyethers cannot be avoided. In addition, the synthesis can lead only to a regulated structure only if diisocyanates having NCO groups of different reactivities are used (for example, 2,4-tolylene diisocyanate). Otherwise in the first stage a considerable proportion of the diisocyanate remains unreacted and in the second stage forms water-insoluble diurethanes with the monoalcohols. This difficulty is not completely avoided even when using diisocyanates having isocyanate groups of different reactivities.

Polyurethane-based thickeners are suitable as auxiliary substances for adjusting the rheological properties of aqueous systems such as automotive and industrial coatings, finishes and paints, printing inks and textile dyes, pigment printing pastes, pharmaceutical and cosmetic preparations, formulations for plant protection and filler dispersions. Although the known polyurethane thickeners may be used in many applications, their thickening action which is often too low for many application and, as previously described, they may only be obtained in an involved and uneconomic manner.

Therefore, an object of the present invention is to provide a simpler method for the preparation of polyurethanes which are effective as thickeners for aqueous systems and are at least equal to prior art products with regard to their thickening action, particularly under low shear conditions. A good thickening action under low shear forces is particularly necessary in order to have a favorable influence on the flow of aqueous latex paints.

This object may be achieved in accordance with the process of the present invention described in more detail below.

SUMMARY OF THE INVENTION

The present invention relates to a process for the preparation of polyurethanes suitable for use as thickeners for aqueous compositions by reacting at an NCO/OH equivalent ratio of 0.9:1 to 1.2:1
   a) a polyether component having an OH number of 10 to 30 mg KOH/g and obtained by the alkoxylation of a mixture of
      a1) 30 to 80 mole % of a monofunctional alcohol or alkylphenol having 8 to 30 carbon atoms,
      a2) 2 to 10 mole % of sodium hydroxide or potassium hydroxide,
      a3) 10 to 60 mole % of water and
      a4) 0 to 10 mole % of a trihydric to hexahydric alcohol having a molecular weight of 92 to 600,
   with ethylene oxide or a mixture of ethylene oxide with up to 20 mole %, based on the total moles of alkylene oxides, of propylene oxide, in which the percentages of a1) to a4) add up to 100,
   with
   b) a polyisocyanate component containing at least one organic diisocyanate, optionally in admixture with up to 20 mole %, based on the total moles of component b), of higher than difunctional polyisocyanates.

The invention also relates to the polyurethanes obtainable by this method and their use, optionally in combination with other thickeners, for the thickening of aqueous systems.

DETAILED DESCRIPTION OF THE INVENTION

The method according to the invention has a number of important advantages compared with the methods of the prior art:

—In the preparation of the polyethers the quantity of alkali catalyst required for the final stage can be used from the beginning of the reaction.

—The production of alcoholates by dehydration at the beginning of the reaction can be omitted, since the added water and that originating from the alkali hydroxide itself acts as a starter.

—In spite of relatively high alkali coverage, no solidification of the initial mixture takes place at the beginning of the reaction.

—The quantity of the starter mixture is about 3 wt. %, based on the weight of the final product, a quantity which is sufficient for a single-stage one-pot reaction.

—The method according to the invention provides a polyether mixture which can be converted to a highly effective polyurethane thickener by reaction with organic diisocyanates accompanied by an increase in molecular weight. The separate preparation of monofunctional and higher functional polyether alcohols is therefore unnecessary.

The initial mixture for the preparation of polyol component a) contains 30 to 80 mole %, preferably 40 to 75 mole % and more preferably 50 to 70 mole % of component a1); 2 to 10 mole %, preferably 5 to 9 mole % and more preferably 6 to 9 mole % of component a2); 10 to 60 mole %, preferably 15 to 50 mole % and more preferably 20 to 45 mole % of component a3); and 0 to 10 mole %, preferably 0 to 8 mole % and more preferably 0 to 5 mole % of component a4).

Component a1) is selected from monofunctional alcohols or alkylphenols having 8 to 30, preferably 10 to 24 and more preferably 12 to 22 carbon atoms. Examples include the isomeric octanols, nonanols, decanols, dodecanols, tetradecanols, hexadecanols, octadecanols, behenyl alcohol and mixtures thereof, as well as technical fatty alcohol mixtures of a corresponding average chain length, which are available under various tradenames. Additional examples include also alkylphenols such as the isomeric octyl-, nonyl-, decyl- or dodecylphenols. More preferred are monohydric aliphatic alcohols having 12 to 18 carbon atoms and mixtures thereof. Stearyl alcohol is most preferred.

Component a2) is sodium hydroxide or potassium hydroxide.

Component a3) is water. Components a2) and a3) are preferably combined, i.e., used in the form of commercially available concentrated alkali.

Component a4) is selected from trihydric to hexahydric alcohols having a molecular weight of 92 to 600, preferably 92 to 400 and more preferably 92 to 200. Examples include glycerol, trimethylolpropane, pentaerythritol and/or sorbitol. Glycerol or trimethylolpropane are preferred.

In the alkoxylation reaction the alkylene oxide used is ethylene oxide or a mixture of ethylene oxide together with up to 20 mole %, based on the total moles of alkylene oxide, of propylene oxide. The alkylene oxide is preferably exclusively ethylene oxide.

In order to carry out the alkoxylation reaction a "starter mixture" is initially prepared from starting components a1) to a3) and optionally a4) and is then alkoxylated in a known manner. The alkylene oxide can be added, for example, continuously with constant thorough mixing (stirring). The alkoxylation reaction may be carried out under excess pressure at 80° to 150° C., preferably 100° to 120° C. The quantitative proportions of the coreactants are adjusted to obtain the desired OH number of the alkoxylation product of 10 to 30, preferably 12 to 26 and more preferably 15 to 22 mg KOH/g. After termination of the reaction, working up is carried out in known manner, i.e., the catalyst is neutralized, for example, using 20% sulphuric acid.

The alkoxylation product then present, optionally after removal by filtration of the salt formed by the neutralization of the catalyst, is dehydrated, preferably in a vacuum (for example, 1 to 10 mbar/100° to 150° C.), prior to further use. While neutralization of the basic catalyst should be carried out with a substantially stoichiometric amount of acid (pH after neutralization about 6 to 7), removal by filtration of the salts formed from neutralization is not absolutely necessary since the latter, due to their low concentration, does not exert a detrimental influence on the resulting products or their use.

Component b) is selected from diisocyanates having a molecular weight of 168 to 300. Commercially available diisocyanates are preferred such as hexamethylene diisocyanate (HDI), 1-isocyanato-3,3,5-trimethyl-5-isocyanatomethyl-cyclohexane (IPDI), 4,4'-diisocyanatodicyclohexyl-methane (HMDI), 2,4-diisocyanatotoluene and mixtures thereof with up to 35 wt. %, based on the weight of the mixture, of 2,6-diisocyanatotoluene, 4,4'-diisocyanatodiphenyl-methane and mixtures thereof with 2,4'- and optionally 2,2'-diisocyanatodiphenylmethane, and mixtures of any of the preceding diisocyanates.

Isocyanate component b) may also contain, in addition to diisocyanates, up to 20 mole %, based on the total weight of component b), of higher than difunctional isocyanates. These include higher functional polyisocyanates of the diphenylmethane series which, together with the diisocyanates of the diphenylmethane series set forth above, are formed during the phosgenation of aniline/formaldehyde condensates. The higher-functional polyisocyanates also include, in particular, the known coating polyisocyanates containing urethane, allophanate, biuret and/or isocyanurate groups, in particular those based on HDI. Preferably, isocyanate component b) exclusively contains the aliphatic polyisocyanates previously set forth. HDI is most preferably used as isocyanate component b).

The reaction between components a) and b) is carried out in a known manner, optionally in the presence of known catalysts, such as tin dioctoate or dibutyltin dilaurate. The reaction is carried out preferably without solvent at 60° to 150° C., preferably at 80° to 120° C., using approximately equivalent quantities of the starting components (NCO/OH equivalent ratio=0.9:1 to 1.2:1, preferably 0.95:1 to 1.1:1). The use of a small excess of isocyanate may be used to compensate for the detrimental influence of traces of water which may still be present. The reaction may be carried out by placing component a) in a receiver at 60° to 80° C. and then stirring in component b) all at the same time. Simultaneously with or following the addition of component b), 0.05 to 0.3 wt. %, based on the weight of the reaction mixture, of the catalyst may optionally be added. The reaction is then carried until completion at 100° to 120° C., which generally takes place within a period of 3 to 6 hours. The end of the reaction can be verified by IR spectroscopy.

The resulting products are generally colorless to yellowish waxes having softening points or softening ranges within the temperature range of 40° to 80° C. For later use it is often advantageous to mix the polyurethanes according to the invention with additives such as formulating agents, solvents, water, emulsifiers or stabilizers to form liquid formulations.

The polyurethanes according to the invention are suitable as thickeners for aqueous or predominantly aqueous systems such as paints, printing pastes and pigment pastes, filler dispersions and pigment dispersions, and also as auxiliary substances for textiles, leather and paper, preparations for petroleum production, preparations of detergents, adhesives, waxes for polishes, formulations for pharmaceutical and veterinary purposes, formulations for plant protection and cosmetic articles. Water can also be thickened with the polyurethane thickeners according to the invention and then blended with further additives or added to aqueous preparations. The thickeners according to the invention may also be used in mixtures with other thickeners such as those based on polyacrylates, cellulose derivatives or inorganic thickeners.

Examples of aqueous systems which can be thickened according to the invention are aqueous polyacrylate dispersions, aqueous dispersions of mixed polymers of olefinically unsaturated monomers, aqueous polyvinyl acetate dispersions, aqueous polyurethane dispersions, aqueous polyester dispersions and in particular ready-to-use preparations of the kind already mentioned above based on such dispersions.

The thickeners according to the invention may also be used as solids, preferably as granular material or optionally as powder. It is preferable, however, to use liquid formulations which, in addition to the polyurethanes according to the invention, contain water, solvents (such as butyl diglycol, isopropanol, methoxypropyl acetate, ethylene glycol and/or propylene glycol), nonionic emulsifiers, surfactants and/or optionally other additives, because they considerably facilitate the incorporation of the thickeners according to the invention into aqueous or predominantly aqueous systems.

The ready-to-use preparations of the thickeners according to the invention are particularly preferably aqueous solutions or dispersions having a solids content of 10 to 80 wt. %, preferably 30 to 60 wt. % and more preferably 40 to 50 wt. %.

The quantity of thickeners according to the invention which are added to the aqueous or predominantly aqueous systems to achieve the desired thickening depends upon their intended use and can be established by a simple preliminary testing. Generally, 0.05 to 10 wt. %, preferably 0.1 to 4 wt. %, and more preferably 0.1 to 1 wt. % of the thickeners according to the invention are used. These percentages are based on the solids content of the thickener and to the solids content of the aqueous system to be thickened.

The following examples serve to provide a further explanation of the invention. The assessment of the activity (viscosity) of the thickener according to the invention and the viscosity determinations of the anhydrous polyurethanes are carried out using a commercially available Haake rotating viscometer. All molecular weights are average molecular weights of the alcohols, which can be calculated from the OH content and the OH functionality. All percentages, unless otherwise indicated, are based on weight.

EXAMPLES

Preparation of polyether A—according to the invention 2,705 g (10 moles) of stearyl alcohol was melted in a 100 liter tank equipped with jacket heating, an anchor mixer at the base and a reflux condenser (brine cooling −30° C.). Then 136.3 g of 50% KOH (1.215 moles KOH, 3.785 moles H$_2$O) was added under nitrogen and the mixture was heated to 110°–115° C. under an excess pressure of 2 bar. 58,730 g of ethylene oxide (empirical excess of 2.8%) was added at this temperature over the course of 10 hours. After continued reaction for a further 2 hours, the mixture was cooled to 80° C. and adjusted to a pH of 6.5 by means of 20% H$_2$SO$_4$.

Water was distilled off at 120° C./10 mbar within 2 hours and the mixture was compressed on a Seitz filter (pore size 20μ). An almost colorless wax (fp 60°) was obtained which had an OH number of 18.5 and a viscosity at 75° of 330 mPa.s. The polyether was a mixture of monofunctional (MW≈3000) and bifunctional (MW≈6000) polyoxyethylene in the molar ratio of 2:1.

Example 1 (method according to the invention)

6,064 g (2 moles of OH groups) of polyether A was melted under nitrogen and freed from traces of water at 1 mbar/120° C. within 2 hours. The polyether was cooled to 80° C. and then 168 g (1 mole) of hexamethylene diisocyanate was added and the mixture was stirred at this temperature for 2 hours. After the addition of 5 g of tin dioctoate, stirring was continued at 120° C. for a further 2 hours. Afterwards NCO was no longer detected by IR spectroscopy. The product was poured out onto metal plates. It was a pale yellowish wax having a softening point of 65° C. and a viscosity at 75° C. of 250 mPa.s. The viscosities of the pure polyurethane (unlike the viscosities of their aqueous solutions) were largely independent of the shear force being applied during the determination of the viscosity and were determined at 75° C. This also applies to the viscosity data for the anhydrous products according to the invention set forth below.

Example 1a

The procedure was the same as Example 1 except that the dehydration step was omitted, The residual water content (0.01%) remaining from the polyurethane preparation was compensated for by the addition of a 10% molar excess of hexamethylene diisocyanate, The end product exhibited a slightly increased viscosity at 75° C. of 280 mPa.s.

The polyethylene glycol polyethers listed in the following Table were prepared similarly to polyether A.

| Polyether | Moles of alcohol | Moles of alkali hydroxide | Moles of water | Epoxide | OH number | Physical state/ viscosity* |
|---|---|---|---|---|---|---|
| B | 10-stearyl | 1.551 NaOH | 3.449 | 80% ethylene oxide 20% propylene | 24.0 | liquid/260 |
| C | 10-dodecyl | 1.215 KOH | 3.785 | Ethylene oxide | 17.0 | wax/350 |
| D | 10-nonylphenol | 1.215 KOH | 3.785 | Ethylene oxide | 20.2 | wax/320 |
| E | 10-fatty alcohol mixture $C_{14}$-$C_{22}$ | 0.9306 NaOH | 2.096 | Ethylene oxide | 19.3 | wax/250 |
| F | 10-hexadecanol | 2.43 KOH | 7.57 | Ethylene oxide | 26.7 | wax/220 |
| G | 9.5-stearyl 0.5-glycerol | 1.215 KOH | 3.785 | Ethylene oxide | 17.9 | wax/380 |

*) Physical state at 25° C., viscosity in mPa · s at 75° C.

The polyurethane thickeners listed in the following Table were prepared similarly to Example 1 and after completion of the reaction were dissolved to form 25% solutions in propylene glycol/water (weight ratio=6:4).

| Example | Polyether | Diisocyanate | NCO/OH equivalent ratio | Catalyst |
|---|---|---|---|---|
| 2 | A | 80% 2,4-, 20% 2-6- tolylene diisocyanate | 1.0 | — |
| 3 | A | IPDI | 1.05 | Diazobicyclooctane |
| 4 | A | HMDI | 0.95 | Dibutyltin dilaurate |
| 5 | B | HMDI | 1.1 | Dibutyltin dilaurate |
| 6 | C | HDI | 1.1 | Tin dioctoate |
| 7 | D | HDI | 1.05 | Tin dioctoate |
| 8 | E | HDI | 1.05 | Tin dioctoate |
| 9 | F | HDI | 1.05 | Tin dioctoate |
| 10 | G | HDI | 1.05 | Tin dioctoate |
| 11 | A | HDI/HDI-biuret mixture, weight ratio 9:1 | 1.0 | Tin dioctoate |
| Comparison Example | $a_1 + a_2$ | 2,4-tolylene diisocyanate | 1.0 | — |

Comparison Example

The comparison example is a comparison with Example 2 (comparable diisocyanate, identical molar ratio of the monohydric and dihydric polyether alcohols).

Polyether $a_1$ (monofunctional)

In an apparatus similar to Example 1, 5,410 g (20 moles) of stearyl alcohol was melted and 136.3 g of 50% KOH was added under nitrogen. The alcohol was converted into the alcoholate by distilling off water at 10 mbar and 105° C. over the course of 8 hours during which visible deposits of stearyl alcohol formed in the condenser.

55,000 g of ethylene oxide was then added at 100° C. and 2 Pa.s over a period of 6 hours. Afterwards the OH number was 18.4.

The working up was carried out as in Example 1. An almost colorless wax having an OH number of 17.6 was obtained.

Polyether $a_2$ (difunctional)

Following the procedure set forth for the preparation of polyether $a_1$, 818 g (7.29 moles) of 50% KOH was added to 6,360 g (60 moles) of diethylene glycol and converted into an alcoholate by dehydration. 59.5 kg of ethylene oxide was then added and reacted for a further 4 hours. Afterwards the OH number was 114.

50.5 kg of the polyether (approx. ⅚ of the total) was then withdrawn and stored under strict exclusion of air. 50 kg of ethylene oxide was added to the remainder (approx. 1/6 of the total) and polymerized following the procedure used to prepare Polyether A. After similar working up, a yellowish wax having an OH number of 17.8 was obtained.

Preparation of a thickener from the two polyethers $a_1$ and $a_2$ 6,303 g (1 mole) of the polyether $a_2$ was carefully dehydrated at 1 mPa.s and 120° C. within a period of 2 hours and, after it had been cooled to 60° C., 348 g (2 moles) of 2,4-tolylene diisocyanate was added. After the reaction mixture had been stirred at this temperature for 6 hours, the NCO content was 1.25% (calculated 1.26%). 6,374 g (2 moles) of the separately dehydrated monofunctional polyether $a_1$ was then stirred in as a liquid at a temperature of 80° C., and the mixture was further stirred for 3 hours at 80° C. and for 3 hours at 120° C. Afterwards NCO was no longer detectable by IR spectroscopy.

The product was drawn off onto a metal plate and formed a yellow wax having a softening point of 67° C. and a viscosity of 3,000 mPa.s at 75° C.

Examples of use:

Examples 12 to 22 show that by using thickeners according to the invention, latex paints can be obtained which exhibit improved processing properties (for example, sedimentation stability, applicability, flow and suitability for forming thick coatings). The viscosities of the paints prepared using the thickeners according to the invention and their yield values were measured with a Haake viscometer at $1\ s^{-1}$, $10\ s^{-1}$ or $10^4\ s^{-1}$.

Examples 12 to 22

Acrylate-based latex gloss paints were prepared from 5 g of the polyurethane thickeners and the following ingredients:

| | |
|---|---|
| AMP 90[1] | 2.5 g |
| Borchigen ND[2], 25% in water | 13.6 g |
| Borchigen DFN[2], 100% in water | 5.0 g |
| Neocryl AP 2860[3] | 3.2 g |
| TiO$_2$-RHD-2 | 225.0 g |
| Methoxybutanol | 17.0 g |
| Propylene glycol | 17.0 g |
| Butyl diglycol | 17.0 g |
| Water | 44.7 g |
| Neocryl XK 62[4] | 540.0 g |
| Water | 110.0 g |
| | 995.0 g |

[1](2-Amino-2-methylpropanol-1, 90% in water), Angus Chemie GmbH, Essen
[2]Wetting agent, Gebr. Borchers AG, Goslar
[3]Defoaming agent, ICI Resins, Runcorn, England
[4]Anionic dispersant based on acrylate/styrene, ICI Resins The viscosities are set forth in Table 3.

TABLE 3

| Example | Thickener from | Viscosity at $[s^{-1}]$ [Pa.] | | |
|---|---|---|---|---|
| No. | Example | 1 | 10 | $10^4$ |
| 12 | 1 | 23.2 | 17.6 | 0.16 |
| 12a | Comparison | 25.1 | 18.2 | 0.18 |
| 13 | 2 | 35.8 | 26.4 | 0.18 |
| 14 | 3 | 24.0 | 18.2 | 0.16 |
| 15 | 4 | 25.2 | 19.8 | 0.17 |
| 16 | 5 | 22.7 | 17.8 | 0.15 |
| 17 | 6 | 3.6 | 1.4 | 0.10 |
| 18 | 7 | 16.2 | 12.3 | 0.11 |
| 19 | 8 | 13.9 | 10.6 | 0.10 |
| 20 | 9 | 18.6 | 14.1 | 0.13 |

TABLE 3-continued

| Example | Thickener from | Viscosity at $[s^{-1}]$ [Pa.] | | |
|---|---|---|---|---|
| No. | Example | 1 | 10 | $10^4$ |
| 21 | 10 | 29.8 | 19.9 | 0.17 |
| 22 | 11 | 22.6 | 16.4 | 0.12 |

These results show the improved suitability of the polyurethanes according to the invention as thickeners for an aqueous coating materials. The comparatively low thickening action of the polyurethanes in Example 6 (Use Example 17) may be attributed to the use of a comparatively short-chained monohydric alcohol a1) (dodecyl alcohol). However, this apparent disadvantage is compensated for by a particularly favorable flow in the corresponding coating material.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polyurethane suitable for use as a thickener for aqueous compositions by reacting at an NCO/OH equivalent ratio of 0.9:1 to 1.2:1 a) a polyether component having an OH number of 10 to 30 mg KOH/g and obtained by the alkoxylation of a mixture of a1) 30 to 80 mole % of a monofunctional alcohol or alkylphenol having 8 to 30 carbon atoms, a2) 2 to 10 mole % of sodium hydroxide or potassium hydroxide, a3) 10 to 60 mole % of water and a4) 0 to 10 mole % of a trihydric to hexahydric alcohol having a molecular weight of 92 to 600, with ethylene oxide or a mixture of ethylene oxide with up to 20 mole %, based on the total moles of alkylene oxides, of propylene oxide, in which the percentages of al) to a4) add up to 100, with b) a polyisocyanate component containing at least one organic diisocyanate, optionally in admixture with up to 20 mole %, based on the total moles of component b), of higher than difunctional polyisocyanates.

2. The process of claim 1 wherein component a1) consists of monohydric aliphatic alcohols having 12 to 18 carbon atoms or mixtures thereof.

3. The process of claim 1 wherein component b) is selected from the group consisting of hexamethylene diisocyanate, 4,4'-diisocyanato-dicyclohexylmethane, 1-isocyanato-3,3,5-isocyanatomethylcyclohexane and mixtures thereof.

4. The process of claim 2 wherein component b) is selected from the group consisting of hexamethylene diisocyanate, 4,4'-diisocyanato-dicyclohexylmethane, 1-isocyanato-3,3,5-isocyanatomethylcyclohexane and mixtures thereof.

5. A polyurethane suitable for use as a thickener for aqueous compositions which is prepared by reacting at an NCO/OH equivalent ratio of 0.9:1 to 1.2:1 a) a polyether component having an OH number of 10 to 30 mg KOH/g and obtained by the alkoxylation of a mixture of a1) 30 to 80 mole % of a monofunctional alcohol or alkylphenol having 8 to 30 carbon atoms,
a2) 2 to 10 mole % of sodium hydroxide or potassium hydroxide,
a3) 10 to 60 mole % of water and
a4) 0 to 10 mole % of a trihydric to hexahydric alcohol having a molecular weight of 92 to 600, with ethylene oxide or a mixture of ethylene oxide with up to 20 mole %, based on the total moles of alkylene oxides, of propylene oxide, in which the percentages of a 1) to a4) add up to 100, with b) a polyisocyanate component containing at least one organic diisocyanate, optionally in admixture with up to 20 mole %, based on the total moles of component b), of higher than difunctional polyisocyanates.

6. The polyurethane of claim 5 wherein component a1) consists of monohydric aliphatic alcohols having 12 to 18 carbon atoms or mixtures thereof.

7. The polyurethane of claim 5 wherein component b) is selected from the group consisting of hexamethylene diisocyanate, 4,4'-diisocyanato-dicyclohexylmethane, 1-isocyanato-3,3,5-isocyanatomethylcyclohexane and mixtures thereof.

8. The polyurethane of claim 6 wherein component b) is selected from the group consisting of hexamethylene diisocyanate, 4,4'-diisocyanato-dicyclohexylmethane, 1-isocyanato-3,3,5-isocyanatomethylcyclohexane and mixtures thereof.

9. An aqueous composition containing the polyurethane of claim 5 as a thickener.

* * * * *